United States Patent [19]

Colley, III et al.

[11] Patent Number: 4,831,507
[45] Date of Patent: May 16, 1989

[54] FREQUENCY CONTROLLED PRELOAD

[75] Inventors: William C. Colley, III, Oberlin; David Kachmarik, North Olmsted, both of Ohio

[73] Assignee: Reliance Comm/Tec Corporation, Chicago, Ill.

[21] Appl. No.: 242,558

[22] Filed: Sep. 12, 1988

[51] Int. Cl.$^4$ ............................................. H02M 3/335
[52] U.S. Cl. ........................................ 363/21; 363/97
[58] Field of Search ................................... 363/18–21, 363/39, 41, 47, 48, 124, 95, 97, 131

[56] References Cited

U.S. PATENT DOCUMENTS

| | | | |
|---|---|---|---|
| 4,415,959 | 11/1983 | Vinciarelli | 363/21 |
| 4,468,722 | 8/1984 | Kammiller | 363/21 |
| 4,517,633 | 5/1985 | Melcher | 363/21 |
| 4,521,842 | 6/1985 | Kammiller | 363/21 |
| 4,587,604 | 5/1986 | Nerone | 363/17 |
| 4,626,977 | 12/1986 | Carnes et al. | 363/21 |
| 4,691,273 | 9/1987 | Kuwata et al. | 363/132 |
| 4,727,469 | 2/1983 | Kammiller | 363/53 |

Primary Examiner—Peter S. Wong
Attorney, Agent, or Firm—Michael M. Rickin

[57] ABSTRACT

A preload for use in a converter whose operating frequency changes with changes in load and/or input voltage. The preload is connected to the converter output to keep the operating frequency above the audible range of frequencies. The time for which the preload is connected to the converter output is inversely related to converter operating frequency. The preload is first connected when the operating frequency decreases to a predetermined frequency which is above the audible range of frequencies. As the operating frequency continues to decrease, the preload is connected for longer periods of time.

13 Claims, 2 Drawing Sheets

FREQUENCY CONTROLLED PRELOAD

BACKGROUND OF THE INVENTION

1. Field of the Invention

This invention relates to converters whose operating frequency changes with load and/or input voltage and more particularly to a preload for use in such converters which is controlled as a function of operating frequency.

2. Description of the Prior Art

There are many different topologies which can be used in DC to DC converters. One such topology is that disclosed in U.S. Pat. No. 4,415,959 which issued on Nov. 15, 1983 and is entitled "Forward Converter Switching At Zero Current" (hereinafter "the '959 patent"). That topology, which will be referred to hereinafter as "the quasi-resonant topology", is quite attractive in that it generally operates at a relatively high frequency and the switching device which is connected in series with the source can be switched on and off at essentially zero current.

The one drawback to the quasi-resonant topology as with any resonant topology is that the operating frequency decreases with changes in load and/or input voltage. More specifically, as either the load current decreases or the input voltage increases, the operating frequency decreases from its maximum which occurs for full load and low input voltage. Should the operating frequency decrease sufficiently, the converter operation will become audible. That is undesirable. Therefore, it is desirable to limit converter operating frequency so that it does not fall into the audible range for light load and/or high input voltage operating conditions.

One example of a resonant converter topology which includes circuitry to limit the operating frequency at light loads such that it is not within the audible range of frequencies is shown in U.S. Pat. No. 4,587,604 entitled "Power Supply Employing Low Power and High Power Series Resonant Circuits" and which issued on May 6, 1986. That patent is assigned to the same assignee as is the present invention. The supply shown therein is a series resonant converter which includes both low power and high power series resonant circuits. Both circuits operate when the load current is large. The high power circuit is controlled to cease its operation when the load current decreases to a certain level.

Another example of a series resonant converter which includes circuitry to limit the operating frequency at light loads is shown in U.S. Pat. No. 4,691,273 entitled "Series Resonant Converter With Parallel Resonant Circuit" and which issued on Sept. 1, 1987. That patent is assigned jointly to the same assignee as is the present invention and Nippon Telegraph and Telephone Corporation. The supply shown therein includes a parallel resonant circuit located between the clamp diodes and the dominant series resonant capacitors. The parallel resonant circuit has a predetermined resonant frequency which is set to be above the telephone voice band. The circuit limits the operating frequency of the converter for light loads to be no lower than the parallel resonant frequency.

A further example of a series resonant converter which includes circuitry to limit the operating frequency at light loads is shown in U.S. Pat. No. 4,727,469 entitled "Control For A Series Resonant Power Converter" and which issued on Feb. 23, 1988. That patent is also assigned to the same assignee as is the present invention. The supply shown therein includes a low power control as part of the control circuit. When the loading conditions at the output of the converter are at or below a predetermined level, the low power control circuit causes the converter to operate at a frequency which is either above or below the telephone voice band.

SUMMARY OF THE INVENTION

A frequency controlled preload circuit for use in a resonant type variable operating frequency power supply. The supply has an output and a resonant capacitor through a resonant current flows. The frequency of the resonant current is related to the power supply operating frequency.

The circuti has means connected to the resonant capacitor in a manner such that a sample of the resonant current is obtained. The circuit also has means which responds to the resonant current sample to generate a signal indicative of power supply operating frequency. The circuit additionally has means which responds to the indicative signal for connecting a preload across the supply output for a period of time which is inversely related to the operating frequency.

DESCRIPTION OF THE PREFERRED EMBODIMENTS

Figure 1:
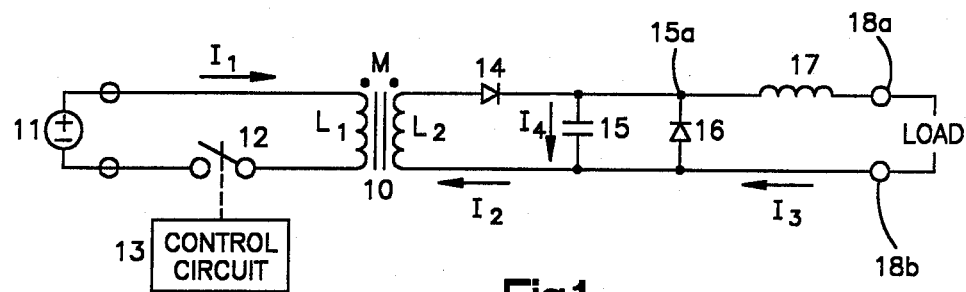
FIG. 1 shows a schematic circuit diagram of a quasi-resonant single-ended converter in which the frequency controlled preload of the present invention can be used.

Referring now to FIG. 1, there is shown a schematic circuit diagram of a quasi-resonant single-ended converter in which the frequency controlled preload can be used. FIG. 1 is identical to FIG. 4 of the '959 patent. Therefore, the same reference numerals and designators are used therein as are used in FIG. 4. Reference numerals 15a, 18a and 18b and the designator $I_4$ for the periodic current flowing in capacitor 22 have been added as they are used in connection with the description of the present invention. The operation of the converter of FIG. 1 will now be generally described with the understanding that a more detailed description of converter operation may be obtained by referring to the '959 patent.

The quasi-resonant single-ended converter of FIG. 1 provides the transfer of electrical energy from voltage source 11 to capacitor 15, isolated from the source by a power transformer 10 constructed to exhibit a small effective leakage inductance for intermediate energy storage. Depending on the turns ratio between the windings of transformer 10, the capacitor 15 can be charged to any desired voltage from source 11. The energy stored in capacitor 15 can be transferred to a load not only in those intervals when energy is not transferred from source 11 to capacitor 15 but also during the course of energy transfer cycles from source 11 to capacitor 15. The characteristic time scale of the energy transfer cycle is proportional to the square root of the product of the capacitance of capacitor 15 and the secondary leakage inductance of transformer 10.

The second unipolar conducting device 16 has a polarity to prevent capacitor 15 from becoming negatively charged, except for a small voltage due to the forward voltage drop of device 16. The inductor 17 has an inductance which is large relative to the effective secondary leakage inductance of the transformer 10. This relatively large inductance of inductor 17 implies that within the characteristic time scale of the energy transfer cycle, the current flowing in the inductor may be regarded as essentially constant.

Figure 2:
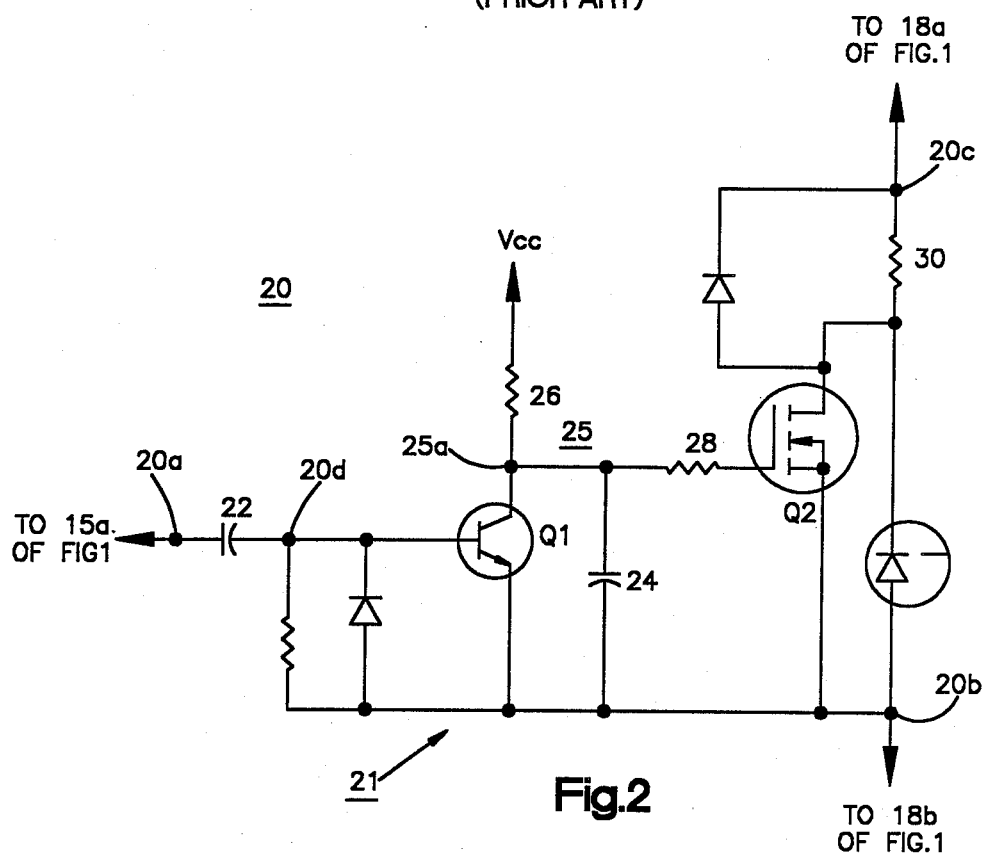
FIG. 2 shows an embodiment of the frequency controlled preload for use in the quasi-resonant converter of FIG. 1.

Referring now to FIG. 2, there is shown a schematic diagram for one embodiment of the frequency controlled preload circuit 20 of the present invention. Circuit 20 includes a capacitor 22 which is connected between terminal 20a and junction 20d. Circuit 20 also includes parallel circuit 21 which connects junction 20d and therefore capacitor 22 to terminal 20b. Terminals 20a and 20b are connected to junction 15a and terminal 18b, respectively, of the converter of FIG. 1. Thus, capacitor 22 is essentially connected in parallel with capacitor 15 of the converter.

Figure 3:
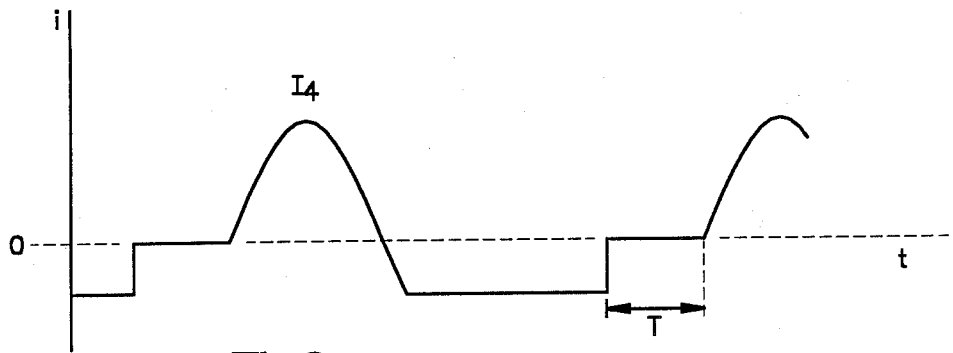
FIG. 3 shows the waveform of the current pulses flowing through the resonant capacitor of the quasi-resonant converter.

The waveform of the periodic current pulses, $I_4$, flowing through capacitor 15 is shown in FIG. 3. For full load and low input voltage the converter's operating frequency is at a maximum, i.e., the time interval between the current pulses flowing through capacitor 15 is relatively small. As the load current decreases and/or the input voltage to the converter increases the time interval, T, between those current pulses increases. As capacitor 22 can be considered to be in parallel with capacitor 15, the waveform of the current flowing through capacitor 22 will have the same shape as the waveform shown in FIG. 3 and differ only in amplitude from the current, $I_4$, flowing in capacitor 15. Thus, the current flowing in capacitor 22 is a sample of the converter current and also a measure of converter operating frequency.

Preload circuit 20 further includes capacitor 24 which is connected between the collector and emitter of a transistor Q1. Capacitor 24 and the collector of Q1 are connected by a resistor 26 to a source of voltage Vcc. When transistor Q1 is turned off, a current flows through resistor 26 to charge capacitor 24. When transistor Q1 is turned on it discharges capacitor 24. The turning on and off of transistor Q1 is determined by the direction that the sample of converter current flows through capacitor 22. When the sample of converter current increases from zero, it charges capacitor 22 and turns on transistor Q1. When the direction of flow of the converter current sample reverses, it turns off transistor Q1.

As described above, capacitor 24 starts to charge when transistor Q1 is turned off. Capacitor 24 will continue to charge for as long as transistor Q1 is off. The time interval between the turning off of Q1 and the next turning on of the transistor is directly related to converter operating frequency as it depends on when the converter current sample next starts to increase in amplitude from zero. The voltage to which capacitor 24 charges is related to the time constant of the RC circuit 25 formed by capacitor 24 and resistor 26.

Capacitor 24 has one end connected by a resistor 28 to the gate of field effect transistor (FET) Q2. The other end of capacitor 24 is connected directly to the source of FET Q2. The drain of Q2 is connected by preload resistor 30 to terminal 20c of circuit 20. Terminal 20c is connected to terminal 18a, i.e, the output, of the converter of FIG. 1.

If capacitor 24 is allowed to charge for a long enough period of time, it will then have sufficient voltage to turn on FET Q2 which places the preload (resistor 30) directly across the output of the converter, i.e. in parallel with the load. When transistor Q1 next turns on, it causes capacitor 24 to discharge which turns off FET Q2 to thereby remove the preload.

It should be appreciated that the converter operating frequency at which the preload is first connected across the converter output is determined by the time constant of the RC circuit 25. That time constant, of course, depends on the capacitance selected for capacitor 24 and the resistance selected for resistor 26. Therefore, the converter operating frequency at which the preload is first connected can be controlled by changing either the capacitance and/or the resistance.

It should further be appreciated that it is the converter operating frequency which determines the period of time for which the preload is connected across the output. As the operating frequency decreases, the preload is connected across the output for longer periods of time.

In designing the frequency controlled preload circuit 20, the capacitance of capacitor 22 should be selected so that at low input voltage there is sufficient current to operate transistor Q1, but the current is not large enough at high input voltage to damage Q1. In one embodiment for circuit 20, the capacitance of capacitor 22 was selected to be 270 picofarads, the capacitance of capacitor 24 was selected to be 0.01 microfarads and the resistance of resistor 26 was selected to be 3.48 Kohms. In that embodiment, the preload is first connected to the output at a frequency of about 50 KHz.

In the quasi-resonant converter shown in FIG. 1, the resonant capacitor 15 is located on the secondary side of the transformer 10, i.e. it is isolated from the current flowing on the primary side of the transformer. As was described in connection with FIG. 2, the sampling capacitor 22 is essentially in parallel with capacitor 15. Therefore, the transformer 10 also isolates circuit 20 from the current flowing on the transformer's primary side.

The frequency controlled preload circuit of the present invention can also be used in other resonant converter topologies such as the series resonant converters described in the aforementioned U.S. Pat. Nos. 4,587,604; 4,691,273; and 4,727,469. In those converters, the resonant capacitor is located on the primary side of the transformer. The capacitor 22 would then also be located on the primary side of the transformer. The preload 30 is, however, placed across the converter output which is on the secondary side of the transformer. In order for circuit 20 to maintain the necessary isolation between the resonant capacitor and the output, the transistor Q1 is replaced by a photocoupler made up of a light emitting diode connected to the sampling capacitor and a phototransistor connected to capacitor 24 and resistor 26 in the same manner as transistor Q1.

Figure 4:
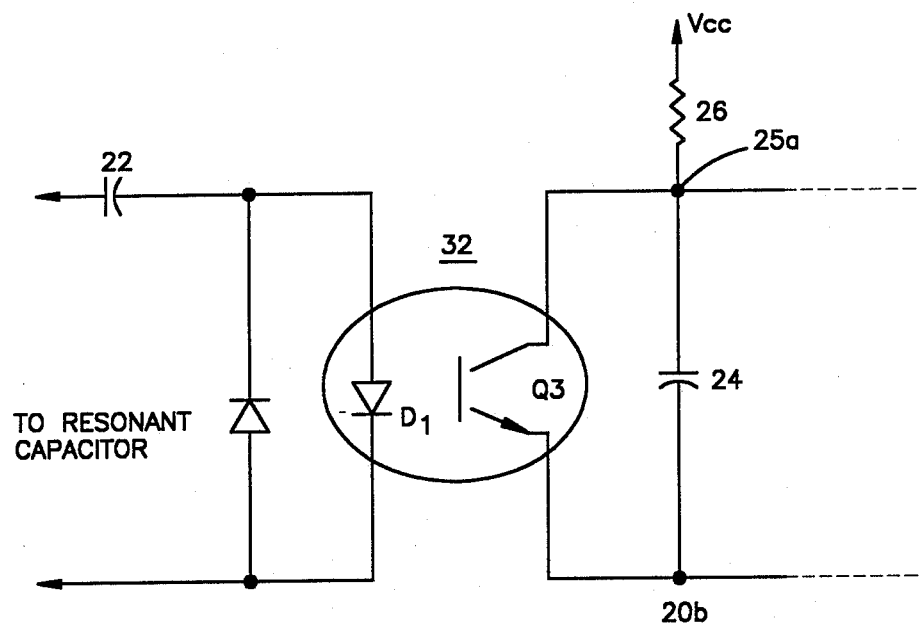
FIG. 4 shows an embodiment of the frequency controlled preload for use in a series resonant converter.

Referring now to FIG. 4, there is shown one embodiment for the frequency controlled preload circuit 20 for use in those other resonant converter topologies. As circuit 20 remains unchanged from the embodiment shown in FIG. 2 except as described above, only that portion of circuit 20 which includes photocoupler 32 need be shown in FIG. 4. Photocoupler 32 comprises light emitting diode D1 and phototransistor Q3. The embodiment shown in FIG. 4 is connected across the resonant capacitor which for the resonant converters shown in the U.S. Pat. Nos. 4,587,604, 4,691,273 and 4,727,469 patents is the parallel combination of the capacitors designated therein as C1 and C2.

It is to be understood that the description of the preferred embodiments are intended to be only illustrative, rather than exhaustive, of the present invention. Those of ordinary skill will be able to make certain additions, deletions, and/or modifications to the embodiments of the disclsoed subject matter without departing from the spirit of the invention or its scope, as defined by the appended claims.

What is claimed is:

1. A frequency controlled preload circuit for use in a resonant type variable operating frequency power supply having an output and resonant capacitor means through which a resonant current having a frequency which is related to said power supply operating frequency flows, said circuit comprising:
    (a) means for connection to said resonant capacitor means in a manner such that a sample of said resonant current is obtained;
    (b) means responsive to said resonant current sample for generating a signal indicative of said power supply operating frequency; and
    (c) means responsive to said indicative signal for connecting preload means to said power supply output for a period of time which is inversely related to said operating frequency.

2. The circuit of claim 1 wherein said connecting means first connects said preload means to said output when said operating frequency decreases from a maximum to a predetermined frequency, said period of time increasing as said operating frequency decreases from said predetermined frequency.

3. The circuit of claim 1 wherein said indicative signal generating means generates said indicative signal with an amplitude which is inversely related to said operating frequency.

4. The circuit of claim 3 wherein said connecting means is responsive to said indicative signal amplitude for connecting said preload means to said output for said period of time which starts when said indicative signal amplitude reaches a predetermined amplitude.

5. The circuit of claim 4 wherein said connecting means is a switching means which closes when said indicative signal amplitude reaches said predetermined amplitude.

6. The circuit of claim 3 wherein said indicative signal generating means includes means responsive to said resonant current sample for causing said indicative signal amplitude to become zero at the beginning of each cycle of said resonant current.

7. The circuit of claim 6 wherein said connecting means is responsive to said indicative signal amplitude for connecting said preload means to said output for said period of time which starts when said indicative signal amplitude reaches said predetermined amplitude and ends when said indicative signal amplitude becomes zero.

8. The circuit of claim 7 wherein said connecting means is a switching means which closes when said indicative signal amplitude reaches said predetermined amplitude and opens when said signal amplitude becomes zero.

9. The circuit of claim 1 wherein said indicative signal generating means comprises:
    (i) switching means which closes essentially when said resonant current sample amplitude changes from zero and opens when said resonant current amplitude reverses; and
    (ii) first means for generating said indicative signal connnected to said switching means in a manner such that said first means generates said indicative signal when said switching means is open.

10. The circuit of claim 9 wherein said first means generates said indicative signal with an amplitude which is inversely related to said operating frequency and said connecting means is responsive to said indicative signal amplitude for connecting said preload means to said output for said period of time which starts when said indicative signal amplitude reaches a predetermined amplitude.

11. The circuit of claim 9 wherein said first means includes an R-C circuit connected to a source of voltage, said switching means connected in parallel with said C.

12. The circuit of claim 10 wherein said first means includes an R-C circuit connected to a source of voltage, said switching means connected in parallel with said C.

13. A frequency controlled preload circuit for use in a resonant type variable operating frequency power supply having an output and resonant capacitor means through which a resonant current having a frequency which is related to said power supply operating frequency flows, said circuit comprising:
    (a) means for connection to said resonant capacitor means in a manner such that a sample of said resonant current is obtained;
    (b) means responsive to said resonant current sample for generating a signal indicative of said operating frequency, said signal having an amplitude inversely related to said operating frequency; and
    (c) means responsive to said indicative signal for connecting preload means across said power supply output when said indicative signal amplitude reaches a predetermined amplitude.

* * * * *